United States Patent
Cho et al.

(10) Patent No.: US 8,506,840 B2
(45) Date of Patent: Aug. 13, 2013

(54) COMPOSITION HAVING RING STRUCTURE AND TERMINAL AMINE GROUPS, AND USE THEREOF AS FLUE GAS ABSORBENT

(75) Inventors: Ara Cho, Seoul (KR); Jong Seop Lee, Daejeon (KR); Byoung Moo Min, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 12/933,024

(22) PCT Filed: Apr. 2, 2009

(86) PCT No.: PCT/KR2009/001711
§ 371 (c)(1), (2), (4) Date: Sep. 16, 2010

(87) PCT Pub. No.: WO2009/125943
PCT Pub. Date: Oct. 15, 2009

(65) Prior Publication Data
US 2011/0012058 A1    Jan. 20, 2011

(30) Foreign Application Priority Data
Apr. 10, 2008 (KR) .................. 10-2008-0033340

(51) Int. Cl.
*C09K 3/00* (2006.01)

(52) U.S. Cl.
USPC .......................................... 252/190; 252/189

(58) Field of Classification Search
USPC .................................. 252/189, 190
See application file for complete search history.

(56) References Cited

U.S. PATENT DOCUMENTS

| | | | |
|---|---|---|---|
| 4,217,237 A | 8/1980 | Sartori et al. | |
| 4,364,915 A * | 12/1982 | Proctor | 423/437.1 |
| 5,120,517 A | 6/1992 | Elshout | |
| 2008/0050296 A1 | 2/2008 | Tontiwachwuthikul et al. | |

FOREIGN PATENT DOCUMENTS

| | | |
|---|---|---|
| DE | 3714209 A1 | 10/1987 |
| JP | 2005296897 | 10/2005 |
| JP | 2006150298 | 6/2006 |

OTHER PUBLICATIONS

English machine translation of Inoue et al. (JP 2006-150298) (2006).*
International Search Report and Written Opinion of counterpart Application No. PCT/KR20091001711, filed on Apr. 2, 2009.

* cited by examiner

*Primary Examiner* — Peter F Godenschwager
(74) *Attorney, Agent, or Firm* — Brian R. Morrison; Westman, Champlin & Kelly, P.A.

(57) ABSTRACT

Disclosed is a flue gas absorbent composition which contains a compound and water. The compound has a ring structure and includes terminal primary amine groups and substituted α-carbon atoms neighboring the amine groups. Further, a use of a solution of a compound having a ring structure and terminal amine groups as a flue gas absorbent is disclosed. The absorbent composition includes a ring-structure compound having superior absorption ability when compared to conventional absorbents, thereby exhibiting excellent properties, i.e., flue gas absorption rate improved by 50 to 100% and flue gas absorption capacity improved by 200 to 400%, as compared with currently used absorbents such as monoethanolamine (MEA) and 2-amino-2-methyl-propanol (AMP).

6 Claims, 3 Drawing Sheets

COMPOSITION HAVING RING STRUCTURE AND TERMINAL AMINE GROUPS, AND USE THEREOF AS FLUE GAS ABSORBENT

CROSS-REFERENCE TO RELATED APPLICATION

This application is the U.S. national phase application of International Patent Application No. PCT/KR2009/001711, filed on Apr. 2, 2009, entitled "Composition Having Ring Structure and Terminal Amine Groups, and Use Thereof as Flue Gas Absorbent"; which claims priority to Korean Patent Application No. 10-2008-0033340, filed with the Korean Intellectual Property Office on Apr. 10, 2008; the disclosures of each of which are incorporated by reference.

TECHNICAL FIELD

The present invention relates to a solution composition having a ring structure and terminal amine groups, and a use thereof as a flue gas absorbent. More particularly, the present invention relates to a solution composition, which has a ring structure and includes terminal primary amine groups and substituted α-carbon atoms neighboring the amine groups, and a use thereof as a flue gas absorbent. The composition according to the present invention has an excellent absorption rate and absorption ability as compared with conventional chemical absorbents.

BACKGROUND ART

Global warming issues have brought worldwide attention to reduction of flue gas. Flue gas mainly contains carbon dioxide, sulfur oxides and nitrogen oxides, and, particularly, reduction of sulfur dioxide and nitrogen dioxides is urgently required. In order to satisfy the requirement for reduction of flue gas, there is an urgent need for development of an absorbent capable of absorbing and treating flue gas. Particularly, there is a need for a complex flue gas absorbent capable of simultaneously removing carbon dioxide, sulfur dioxide and nitrogen dioxide, as opposed to a conventional absorbent which separately processes different gases, thereby causing increased costs and comparatively low efficiency.

Carbon dioxide, a major component of flue gas, is a greenhouse gas and has a severe influence upon global warming. Increasing use of fossil fuels is increasing the amount of carbon dioxide discharged into the atmosphere. Development of techniques for treating greenhouse gases, arising from the global warming issues, has been vigorously conducted by Japan, the U.S.A., and European countries since the early 1990s. According to the World Energy Congress (WEC), average carbon dioxide emission in electric power generation should be maintained at 0.2 kgC/kWh or less in order to achieve a carbon dioxide level in the air of 550 ppm or less by 2050. However, currently known techniques can only achieve average carbon dioxide emissions of 0.9 kgC/kWh and 0.4 kgC/kWh for coal and natural gas, respectively.

Under these circumstances, techniques for separating and processing carbon dioxide have been developed in many countries, primarily in consideration of improvement in cost efficiency. Additionally, base techniques have been established and data for development of such techniques has also been substantially realized. Examples of widely available absorbents for use in absorption and separation of carbon dioxide include monoethanolamine (MEA), 2-amino-2-methyl-propanol (AMP), methyldiethanolamine (MDEA), and the like. MEA is a primary alkanol amine, which quickly reacts with carbon dioxide and has a rapid absorption rate. However, since 1 mole of MEA can absorb only 0.5 moles of carbon dioxide, MEA has a comparatively small carbon dioxide absorption capacity. MDEA and AMP are a tertiary alkanol and a sterically hindered alkanol amine, respectively. Therefore, MDEA and AMP have greater carbon dioxide absorption capacities than MEA, as reported in several papers, and require less energy than MEA when desorbing carbon dioxide by heat. However, reaction rates of MDEA and AMP with carbon dioxide are low.

In Korea, techniques for treating air pollutants, such as sulfur dioxide and nitrogen oxides, have been developed via substantial investment and long-term studies, as compared with techniques for treating carbon dioxide, and some are domestically practiced or have been transferred to other countries. Therefore, a technical gap in this field between Korea and other leading countries is not so wide, as compared with carbon dioxide treatment techniques. Presumably, the domestic technique for treating air pollutants approaches a level of about 70% or more when compared with leading countries in this field. However, a technical gap between Korea and other leading countries in treating nitrogen oxides and small quantities of heavy metals are considered slightly wide due to lack of core techniques thereof.

As in carbon dioxide, since sulfur dioxide and nitrogen oxides also react with water to form acids, e.g., sulfuric acid and nitric acid, irrespective of low primary solubility in water, sulfur dioxide and nitrogen oxides can effectively react with an amine solution as well being desorbed by heat.

Therefore, there is an urgent need for development of a new complex absorbent for flue gas, which has not only a higher flue gas absorption capacity but also all of the aforementioned merits of the conventional carbon dioxide absorbents, that is, a high absorption rate due to fast reaction with flue gas, in order to solve such global warming issues.

DISCLOSURE OF INVENTION

Technical Problem

The present invention is directed to solve the problems as described above, and an aspect of the present invention is to provide a flue gas absorbent composition which has both the high carbon dioxide absorption rate of MEA and the high carbon dioxide absorption capacity of AMP by solving the drawbacks of the conventional carbon dioxide absorbents.

Technical Solution

In accordance with one aspect of the present invention, a flue gas absorbent composition includes: 1~75% by weight (wt. %) of a compound having a ring structure and terminal amine groups; and 25 to 99 wt. % of water.

If the compound having the terminal amine groups is present at less than 1 wt. %, the absorbent does not provide a desired effect. On the other hand, if the compound is present at more than 75 wt. % corrosion of an exhaust system can occur and this concentration is not cost-efficient.

The amine groups of the compound may be a primary amine group. In particular, the compound may have five to six carbon ring atoms.

Further, the terminal primary amine groups may be bonded to a carbon atom of the ring structure and to a carbon atom of a chain, respectively, and the carbon atoms bonded to the terminal primary amine groups may be substituted.

According to another aspect of the present invention, the present invention provides a use of a solution of a compound as a flue gas absorbent composition, the compound having a ring structure and terminal amine groups.

The following examples and experiments prove that the compound according to the present invention provides superior effects as a flue gas absorbent when prepared in a simple solution. That is, it was found that the compound according to the present invention can be used alone as a flue gas absorbent without mixing with other compounds, and this means that the compound of this invention is very practical in terms of cost efficiency.

Hereinafter, the present invention will be described in detail.

As a result of studies conducted over many years, the inventors of the present invention found that compounds satisfying the following conditions can be used for the composition according to the present invention.

1) Nitrogen of an amine group in a ring-structure absorbent has a non-covalent pair of electrons which is not involved in a 1.5 bond such as a resonance structure.
2) An amine group and its neighbors are sterically hindered (in particular, by substitution at an α-carbon neighboring the amine group).
3) An amine group is fixed such that no part of the molecule can rotate due to an sp3 steric structure having a stable ring structure and steric hindrance between the amine group and a neighboring alpha-carbon atom.

It can be seen that amines satisfying the foregoing conditions have stoichiometrically superior absorption and desorption abilities when compared to general amines.

A compound employed for a flue gas absorbent according to the invention meets all of these conditions. That is, the compound has an alicyclic structure, terminal primary amine groups, and five and six carbon ring atoms. The terminal primary amine groups are bonded to one of carbon atoms having a ring structure and to a chain of carbon atoms, respectively, and the carbon atoms bonded to the amine groups are tertiary carbon atoms each having three substituents. Presumably, this steric structure has a considerable effect on flue gas absorption.

The compound for the flue gas absorbent according to the invention may be diaminomenthane. In particular, the compound may be 1,8-diamino-p-menthane (hereafter, referred to as "KIER-C3").

First, absorption mechanisms of carbon dioxide, sulfur dioxide and nitrogen dioxides known in the art are as follows.

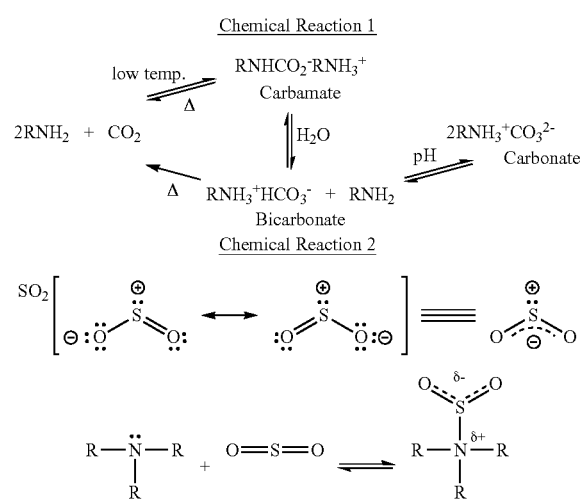

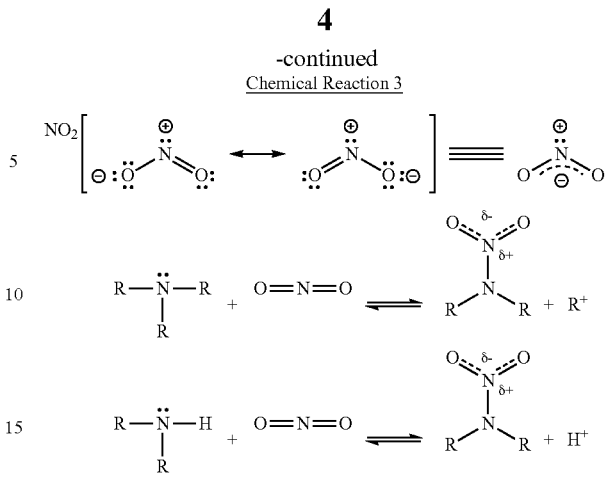

Step 1: Formation of Carbamate

In Step 1, formation of carbamate, carbon dioxide is absorbed. Carbon dioxide is temporarily bonded to a non-covalent pair of electrons of a nitrogen atom contained in an alkanolamine absorbent, thereby forming carbamate. This reaction occurs at a relatively low temperature, and when heated, equilibrium of the reaction is favorably broken to dissociate the carbon dioxide from the amine. Likewise, a similar reaction occurs for sulfur dioxide and nitrogen dioxides.

Step 2: Formation of Bicarbonate

The carbamate is transformed into bicarbonate via hydrolysis and, under adequate conditions, e.g., proper pH, carbonate is formed. The degree of hydrolysis of the carbamate is determined by the concentration of amines, the pH of a solution, the chemical stability of carbamate, etc. Step 2, the formation of bicarbonate, is achieved by hydrolysis of the carbamate, in which carbon dioxide reacts with amines remaining after the hydrolysis of carbamate to form bicarbonate ions. Here, 1 mole of amine is needed to react with 1 mole of carbon dioxide. Likewise, sulfur dioxide and nitrogen dioxides are absorbed to the flue gas absorbent to form N-nitro derivatives, in a manner analogous to the formation of carbamate from carbon dioxide, as shown in Chemical Reactions 2 and 3. In Chemical Reaction 3, tertiary amines may produce byproducts, thereby degrading the absorbent, whereas secondary amines are involved in relatively stable reaction.

With primary and secondary amines, carbamate is primarily formed while only a small amount of bicarbonate formed, i.e. minimal hydrolysis of carbamate occurs. This phenomenon is due to the inherent stability of carbamate, which is not restricted by rotation of a geometric sp3 carbon atom on an amino carbamate group, i.e., steric factors of the group. In the reaction of carbon dioxide and amines with geometrically inferior rotation of sp3 amines such as sterically hindered amines, formation of carbamate and hydrolysis affect the overall reaction equally. This phenomenon is due to the instability of carbamate, in which, unlike general amines, the rotation on the amino carbamate is sterically restricted by a bulky alkyl group or an irrotationally fixed alkyl group. Thus, carbamate becomes structurally unstable and is then easily hydrolyzed.

Likewise, in flue gas treatment, sterically hindered amines and irrotationally fixed amines have stoichiometrically superior absorption and desorption abilities of flue gas as compared to general amines, so that it can be increasingly expected that a flue gas absorbent will be developed therefrom. When a carbon atom neighboring the amine group is substituted, carbamate and nitro-substituents decrease in stability, thereby improving hydrolysis. An amine solution increases concentrations bicarbonate and substituents thereof, and accordingly flue gas load increases. Instability of carbamate and nitro-substituents is reported to be caused by steric hindrance by substitution at the α-carbon. The α-carbon substitution induces interaction between the orbital of $\pi_{ME}$ and $\pi_{ME}^*$ methyl groups and a non-covalent pair of electrons of the nitrogen atom to decrease electric charges of the nitrogen atom, thereby basifying the nitrogen atom into a weak base and weakening a nitrogen-hydrogen bond. As a result, a hydroxyl group in the amine solution, a strong base, promotes hydrolysis.

In the early stage of flue gas absorption, the absorption rate is expected to become slow due to steric hindrance. On the contrary, hydrolysis of carbamate and nitro-substituents is facilitated to increase the yield of amines capable of reacting with flue gas, so that the absorption rate of flue gas increases. Amines with inferior rotation at an sp3 carbon atom have advantages in view of absorption capacity in a flue gas absorption process and rate, in which a sterically hindered amine solution exhibits superior desorption of flue gas when compared to an unsubstituted amine solution. Thus, the sterically hindered amine solution is recycled into an amine solution with a lower concentration of flue gas and has excellent flue gas absorption when being reused to absorb flue gas. For example, in a reaction of carbon dioxide with AMP, which is an α-methyl derivative of MEA, carbamate is almost completely hydrolyzed into bicarbonate, so that no carbamate is found in the amine solution.

Accordingly, KIER-C3 used in the present invention has two terminal primary amine groups and is sterically hindered by α-carbon substitution, so that it is restricted in activity such as molecular rotation. Therefore, as mentioned above, KIER-C3 forms bicarbonate and substituents thereof instead of forming carbamate or nitro-substituents, thereby providing higher absorption capacity than MEA.

Advantageous Effects

As described above, according to the present invention, a flue gas absorbent composition having a ring structure satisfies conditions for an ideal absorbent and has improved flue gas absorption rate and ability as compared with widely used MEA and AMP.

MODE FOR THE INVENTION

Next, the present invention will be described with reference to examples. However, it should be noted that the present invention is not limited to the examples disclosed below but can be implemented in various ways without departing from the spirit and scope of the accompanying claims.

EXAMPLES

Example 1

Preparation of KIER-C3 Solution (1 wt. %)

A KIER-C3 solution of 1% by weight (wt. %) was prepared by mixing 70% diamiomenthane (Aldrich Co.) and primary distilled water.

Example 2

Preparation of KIER-C3 Solution (20 wt. %)

A KIER-C3 solution of 20 wt. % was prepared in the same manner as in Example 1.

Comparative Example 1

Preparation of MEA Solution (2 wt. %)

A monoethanolamine (MEA) solution of 2 wt. % was prepared by mixing 98% MEA (Fluka Co.) and primary distilled water.

Comparative Example 2

Preparation of MEA Solution (20 wt. %)

An MEA solution of 20 wt. % was prepared in the same manner as in Comparative Example 1.

Comparative Example 3

Preparation of AMP Solution (2 wt. %)

A 2-amino-2-methyl-propanol (AMP) solution of 2 wt. % was prepared by mixing 95% AMP (Aldrich Co.) and primary distilled water.

Comparative Example 4

Preparation of AMP Solution (20 wt. %)

An AMP solution of 20 wt. % was prepared in the same manner as in Comparative Example 3.

Comparative Example 5

Preparation of MDEA Solution (20 wt. %)

An N-methyl-diethanolamine (MDEA) solution of 20 wt. % was prepared by mixing 98% MDEA (Fluka Co.) and primary distilled water.

EXPERIMENTS

Absorption rates and absorption abilities of the solutions prepared in the foregoing examples and comparative examples in 100% carbon dioxide, 100% sulfur dioxide and 100% nitrogen dioxide, and re-absorption abilities of the same after desorption of carbon dioxide were measured at a temperature of 40~50° C.

Experiment 1

Measurement of Flue Gas Absorption Rate

A stainless steel container (inner volume: 497 cc) having a water-heated double jacket to maintain an experimental temperature of 40° C. and a lid with a monometer for measuring an input amount of flue gas was used as an experimental system for a low-concentration absorbent of 1 wt. %. Pressure and temperature changes of the input flue gas were measured according to time using a 30 Channel Hybrid Recorder (Model HR2300, Yokogawa). Since the system was used to measure a small amount of absorbent, an accurate value for 20 wt. % absorbent was measured using a bench-capacity absorber (inner volume: 860 cc) after obtaining approximate values thereof. In the reaction system, an agitator was installed to expand a gas-liquid interface between an absorbent solution and flue gas. Also, a reactor and a flue gas storage were provided in an oven to maintain the system at a temperature of 50° C. Pressure and temperature changes of the flue gas were measured using the 30 Channel Hybrid Recorder (Model HR2300, Yokogawa) and obtained data was stored in a computer.

Figure 1:
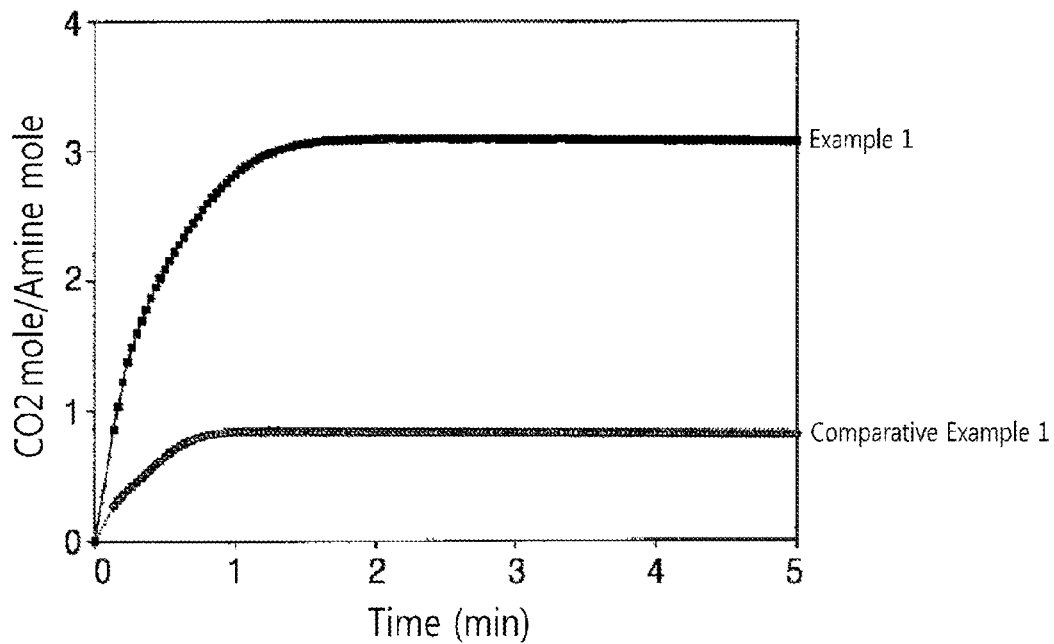
FIG. 1 is a graph depicting pressure change in a system in accordance with absorption time of carbon dioxide in Example 1 (1 wt. % KIER-C3) and Comparative Example 1 (MEA)
Figure 2:
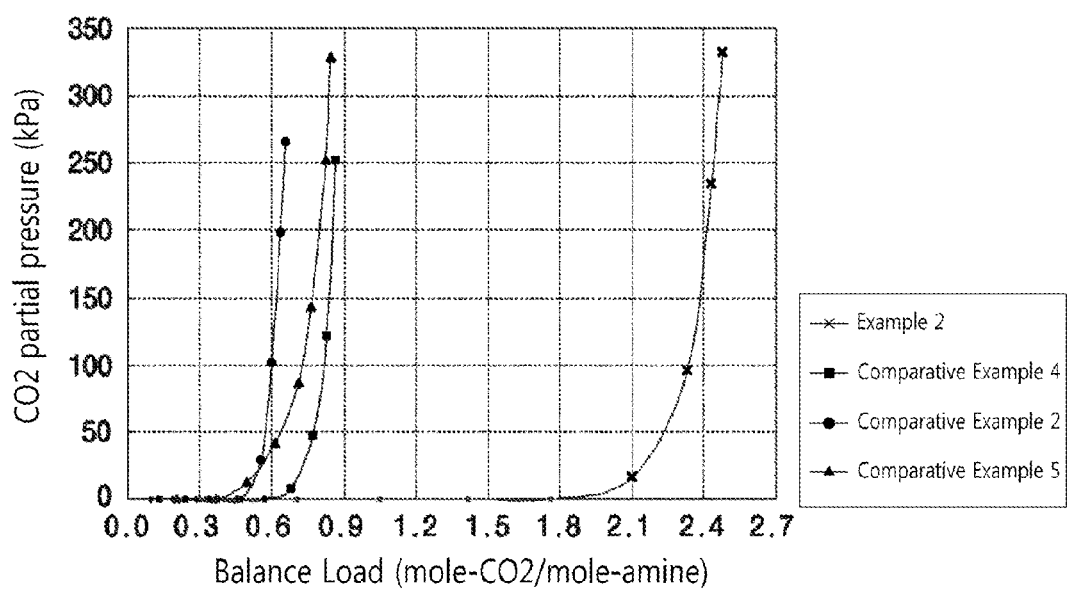
FIG. 2 is a graph depicting pressure change in a system in accordance with absorption time of carbon dioxide in Example 2 (20 wt. % KIER-C3), Comparative Example 2 (MEA), Comparative Example 4 (AMP), and Comparative Example 5 (MDEA)
Figure 3:
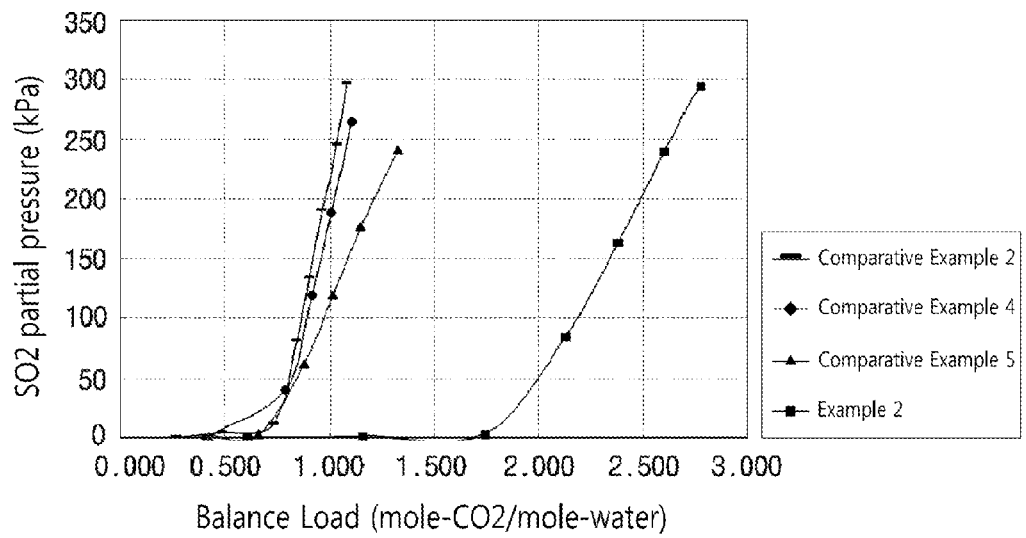
FIG. 3 is a graph depicting pressure change in a system in accordance with absorption time of sulfur dioxide in Example 2 (20 wt. % KIER-C3), Comparative Example 2 (MEA), Comparative Example 4 (AMP), and Comparative Example 5 (MDEA)
Figure 4:
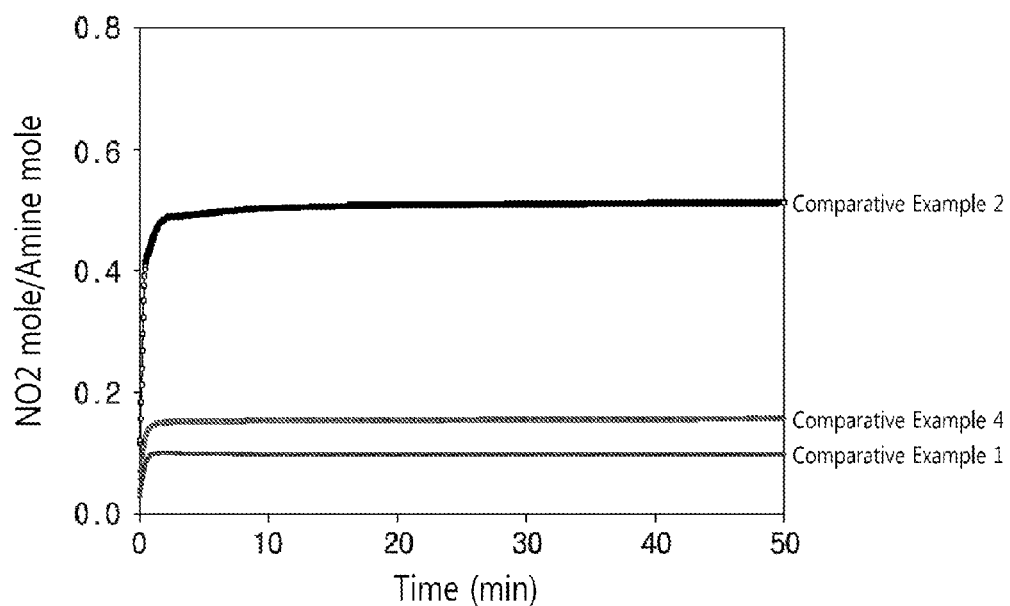
FIG. 4 is a graph depicting pressure change in a system in accordance with absorption time of nitrogen dioxide in Example 2 (20 wt. % KIER-C3), Comparative Example 2 (MEA), and Comparative Example 4 (AMP)

As a result of the experiment, KIER-C3 exhibited an improvement in flue gas absorption rate of 50 to 100%, as shown in FIGS. 1 and 2.

Experiment 2

Measurement of Flue Gas Absorption Ability

In a low-concentration experiment, a reaction system was treated with flue gas several times to prepare a flue gas atmosphere and was maintained at 100% flue gas under a pressure of 22 psi at 40° C. (50° C. for nitrogen dioxide). Then, 100 ml of an absorbent was supplied into the reaction system using a pump (Chunse Pump, 500 cc/min). While carrying out flue gas absorption by rotating a magnetic bar, the absorption of the flue gas was measured according to time via pressure changes and recorded as data in a computer. In a bench-capacity absorber, a reaction system was treated with nitrogen several times to prepare a nitrogen atmosphere, after which 250 ml of an absorbent was supplied into the reaction system using a pump (Chunse Pump, 500 cc/min) and maintained at 50° C. When the temperature was stabilized at 50° C., 100% flue gas was introduced into the reaction system and subjected to an absorption reaction by rotating an agitator. The flue gas was supplied to the system until pressure thereof reached a level at which the absorbent no longer absorbed the flue gas. Absorption of the flue gas according to time was measured via pressure changes and obtained data was stored in a computer.

As a result of the experiment, KIER-C3 exhibited an improvement in flue gas absorption ability of 200 to 400%, as shown in FIGS. 1 to 4.

Experiment 3

Measurement of Re-Absorption Ability after $CO_2$ Desorption

The absorbent saturated with carbon dioxide in Experiment 2 was steeped in an oil bath at 110° C. to desorb carbon dioxide for 20 minutes using an evaporator (Sunil EYELA, N-1000) without a vacuum. To identify desorption of carbon dioxide, the pH of the absorbent was measured before and after the experiment. The carbon dioxide-desorbed absorbent was involved in absorption of carbon dioxide in the same manner as in Experiment 2, and its cyclic effect was observed by measuring a carbon dioxide absorption rate and capacity of the absorbent.

Figure 5:
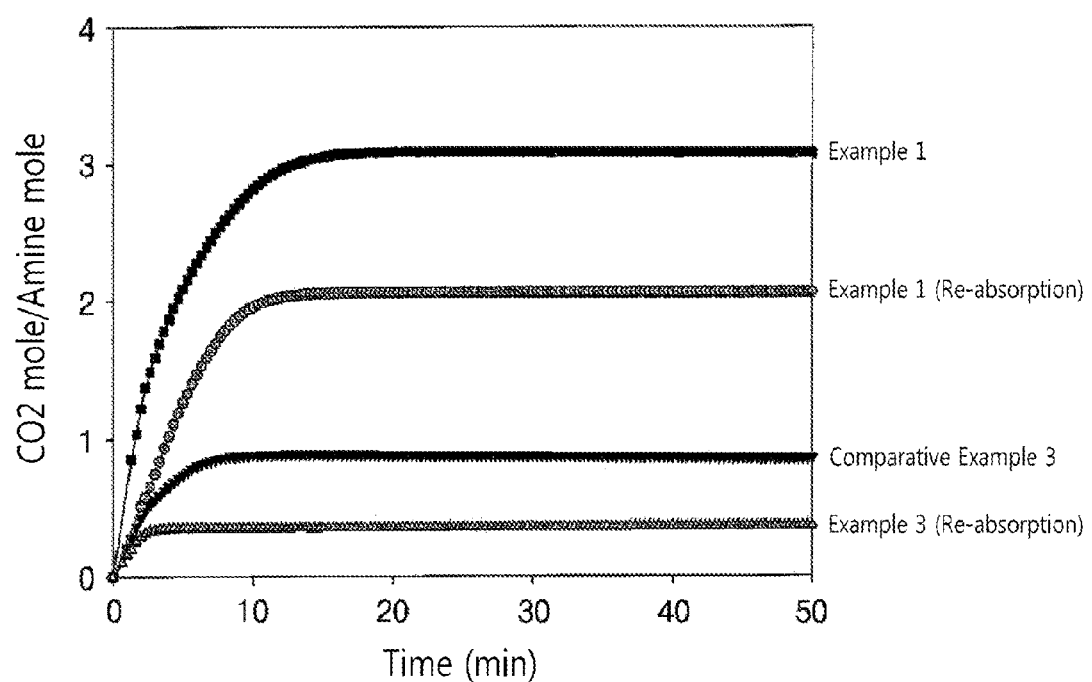
FIG. 5 is a graph depicting pressure change in a system in accordance with absorption time of carbon dioxide in Example 1 (1 wt. % KIER-C3) and Comparative Example 3 (AMP), and a cyclic effect via re-absorption of desorbed carbon dioxide.

As a result of the experiment, KIER-C3 exhibited more than twice the cyclic absorption rate and capacity of AMP, as shown in FIG. 5.

The invention claimed is:

1. A method for treating a flue gas, the method comprising:
   providing a vessel containing an aqueous composition consisting essentially of water and a compound having an alicyclic structure with terminal primary amine groups, wherein the alicyclic structure has 5-20 carbon atoms, wherein five or six of the carbon atoms define a ring structure of the alicyclic structure;
   introducing the flue gas into the vessel, wherein the flue gas comprises carbon dioxide, sulfur dioxide, and nitrogen dioxide;
   reacting the carbon dioxide of the flue gas with the amine groups of the compound of a first portion of the aqueous composition to form carbamate; and
   hydrolyzing the carbamate to form bicarbonate.

2. The method according to claim 1, wherein the compound is diaminomenthane.

3. The method according to claim 1, and further comprising reacting the sulfur dioxide of the flue gas with the amine groups of the compound of a second portion of the aqueous composition.

4. The method according to claim 3, and further comprising reacting the nitrogen dioxide of the flue gas with the amine groups of the compound of a third portion of the aqueous composition.

5. The method according to claim 1, wherein a first terminal amine group of the terminal primary amine groups is bonded to a carbon atom of the ring structure, and wherein a second terminal amine group of the terminal primary amine groups is bonded to a carbon atom of a chain of the alicyclic structure.

6. The method according to claim 1, wherein the water constitutes 25% to 99% by weight of the aqueous solution, and the compound constitutes 1% to 75% by weight of the aqueous solution.

* * * * *

UNITED STATES PATENT AND TRADEMARK OFFICE
CERTIFICATE OF CORRECTION

PATENT NO. : 8,506,840 B2  
APPLICATION NO. : 12/933024  
DATED : August 13, 2013  
INVENTOR(S) : Ara Cho et al.

Page 1 of 1

It is certified that error appears in the above-identified patent and that said Letters Patent is hereby corrected as shown below:

On the Title page, item (56) References:

In the References Cited, delete "PCT/KR20091001711" and insert -- PCT/KR2009/001711 --

Signed and Sealed this
Twenty-first Day of July, 2015

Michelle K. Lee
*Director of the United States Patent and Trademark Office*